US006944574B2

(12) United States Patent
LeBlanc et al.

(10) Patent No.: US 6,944,574 B2
(45) Date of Patent: Sep. 13, 2005

(54) INTEGRATED DATA ACQUISITION SYSTEM FOR PRODUCT IN TRANSIT

(75) Inventors: Ewart O. LeBlanc, Fairport, NY (US); Matile D. Malimabe, Rochester, NY (US); Jalal Rahimi, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/393,679

(22) Filed: Mar. 21, 2003

(65) Prior Publication Data

US 2004/0186691 A1 Sep. 23, 2004

(51) Int. Cl.[7] .............................................. G08B 13/08

(52) U.S. Cl. .................................... 702/187; 340/545.6

(58) Field of Search ................................ 702/2, 187, 1, 702/178, 33, 34, 41, 56, 127, 130, 136, 140, 141, 150; 700/1; 455/575; 340/870.21

(56) References Cited

U.S. PATENT DOCUMENTS

| | | | | | |
|---|---|---|---|---|---|
| 4,234,926 | A | * | 11/1980 | Wallace et al. | 702/188 |
| 4,750,197 | A | * | 6/1988 | Denekamp et al. | 455/404.2 |
| 4,797,663 | A | * | 1/1989 | Rios | 340/691.6 |
| 5,132,968 | A | * | 7/1992 | Cephus | 370/94.1 |
| 5,283,767 | A | * | 2/1994 | McCoy | 367/4 |
| 5,689,243 | A | * | 11/1997 | Bianco | 340/5.26 |
| 5,936,523 | A | * | 8/1999 | West | 340/545.6 |
| 6,429,810 | B1 | * | 8/2002 | De Roche | 342/357.07 |
| 6,570,508 | B1 | * | 5/2003 | Kvenvold | 340/870.17 |
| 2004/0069046 | A1 | * | 4/2004 | Sunshine et al. | 73/23.34 |
| 2004/0186691 | A1 | * | 9/2004 | LeBlanc et al. | 702/187 |

* cited by examiner

*Primary Examiner*—John Barlow
*Assistant Examiner*—Victor J. Taylor
(74) *Attorney, Agent, or Firm*—Perman & Green, LLP

(57) ABSTRACT

A data acquisition system includes a product for shipment to an end user, a sensor system removably connected to the product for recording environmental conditions to which the product is exposed, and a computing device, which upon being connected to the product, is operable to retrieve the recorded environmental conditions. The product may be operable to control the operation of the sensor system, or the sensor system may be operable to record environmental conditions independent of the operation of the product.

18 Claims, 2 Drawing Sheets

INTEGRATED DATA ACQUISITION SYSTEM FOR PRODUCT IN TRANSIT

BACKGROUND OF THE INVENTION

1. Field of the Invention

The present invention relates to a data acquisition system for articles in transit. More particularly, the present invention relates to a system for recording environmental conditions to which a product is subjected during transport.

2. Brief Description of Related Developments

Consumer and industrial products are frequently distributed to end users throughout the world. A particular distribution network may include air travel, water travel, and land travel. The various modes of travel may utilize airplanes, cargo ships, trucks, and rail transport. While in the distribution network, products may be subject to a number of environmental conditions including for example, vibration, shock, temperature, humidity, barometric pressure, etc. While the products may be conveyed by various types of transport, and subjected to various environmental conditions, it is important that they arrive at an end user's location in good condition.

One method of ensuring delivery in good condition is to package the products appropriately. In some enterprises, a department or some other functional entity may be dedicated to making certain that product packaging functions effectively. In order to do so successfully, information regarding the range of environmental conditions that a product may experience is required. One way to gather this information is to include a general purpose data gathering instrument, also referred to as a data recorder, data saver, or data logger, in the package with a product. The instrument typically gathers environmental data during transport. Upon arrival at a destination, the data may be retrieved and analyzed. Once acquired, the data may be used to enhance not only the packaging design but also the design of the product itself may be improved if desired.

General purpose recording instruments are disadvantageous in that they are usually expensive and as a result may only be used on a sample basis. They may also be bulky, making integration into a particular packaging design difficult, and in some instances requiring modification of the packaging. If an enterprise uses multiple packaging designs, the integration or modification may have to be done for each type of design. In addition, extracting data from the instrument may require special interfaces and software.

It would be advantageous to provide a data acquisition system that is inexpensive and easily integrated into an existing product so that it may be used to track a large sample population, or ideally each individual product as it travels through the distribution network to the end user. It would also be advantageous to provide a data acquisition system that may be used without modifying existing packaging. It would be additionally advantageous to provide a data acquisition system from which data may be easily retrieved in a usable format.

SUMMARY OF THE INVENTION

The present invention provides for a data acquisition system that addresses the above-identified limitations.

In one embodiment, the present invention is directed to a data acquisition system, including a product for shipment to an end user, a sensor system removably connected to the product for recording environmental conditions to which the product is exposed, and a computing device, which upon being connected to the product, is operable to retrieve the recorded environmental conditions.

In another embodiment, the present invention is directed to a product for shipment to an and user, including a sensor system removably connected to the product for recording environmental conditions to which the product is exposed, and a communication port for communicating with a computing device, which upon being connected to the product, is operable to retrieve the recorded environmental conditions.

In still another embodiment, the present invention is directed to a sensor system for removable connection to a product for shipment to an end user, the sensor system including an interface to the product, and one or more sensors for recording environmental conditions to which the product is subjected. The sensor system is operable to provide the recorded environmental conditions to a computing device, upon the computing device being connected to the product.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
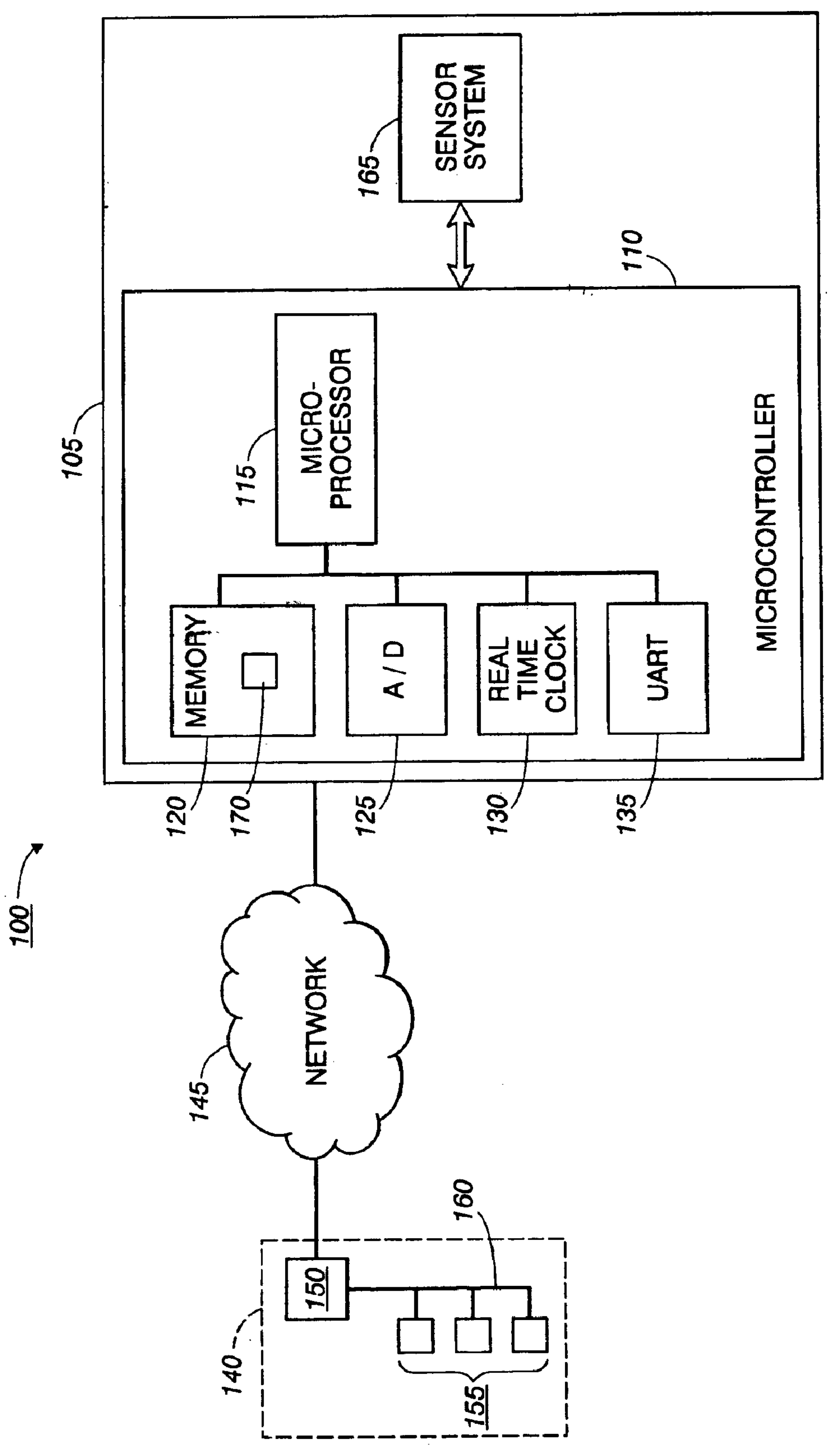
FIG. 1 shows a schematic diagram of a data acquisition system in accordance with the teachings of the present invention.

Referring to FIG. 1, a data acquisition system 100 incorporating features of the present invention is illustrated. Although the present invention will be described with reference to the embodiment shown in the drawings, it should be understood that the present invention can be embodied in many alternate forms of embodiments. In addition, any suitable size, shape or type of elements or materials could be used.

Data acquisition system 100 generally includes a data recording function performed by components within a product 105, and a data retrieval and analysis function represented by an enterprise 140 communicating with product 105 through a network 145.

The present invention provides an integrated sensor system that is easily and inexpensively integrated into an existing product, allowing it to be used to track a large sample population, or each individual product as they pass through a distribution channel. The present invention may be implemented without altering existing packaging for product 105 and also provides for data retrieval in an advantageous manner.

In the embodiment shown in FIG. 1, product 105 is generally one that is conveyed through a distribution channel. Product 105 generally includes a microcontroller 110, typically having a microprocessor 115, on-board memory 120, an analog to digital converter (A/D) 125, a real time clock interrupt controller (RTC) 130, and a universal asynchronous receiver transmitter (UART) 135. Microcontroller 110 may be connected to a communications network 145, that may include any network suitable for communication, for example, the Internet, the Public Switched Telephone Network (PSTN), a wireless network, a wired network, a virtual private network (VPN) etc. Communication may be executed using any suitable protocol, including X.25, ATM, TCP/IP, etc.

Microcontroller 110 may be connected to an enterprise 140 through network 145. Enterprise 140 could be an office of a manufacturer of product 105 or a provider of goods and services related to product 105. Enterprise 140 preferably includes a computer 150 for communicating with microcontroller 110. Enterprise 140 may also include other computers 155 connected to computer 150 through an internal network 160.

Product 105 also includes an integrated sensor system 165 in accordance with the teachings of the present invention, connected to microcontroller 110. In one embodiment, on-board memory 120 on microcontroller 110 may include programs 170 for controlling and interacting with sensor system 165.

Figure 2:
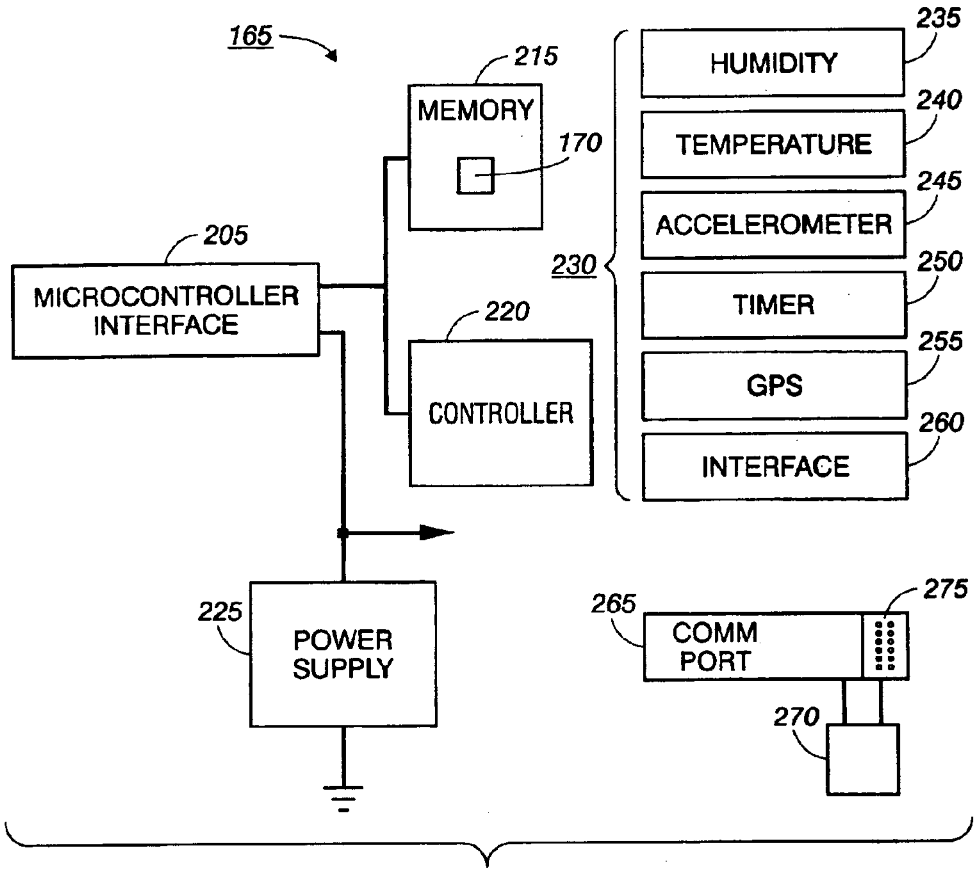
FIG. 2 is a block diagram of a sensor system integrated as part of the data acquisition system.

Sensor system 165 is shown schematically in FIG. 2 and has a form factor that may be easily integrated within product 105 without changing its packaging or shipping requirements. Sensor system 165 may include a microcontroller interface 205, control circuitry 220, memory 215, a power source 225, one or more sensors 230, a sensor interface 260 to accommodate additional sensors, a communications port 265, and a power switch 270.

Microcontroller interface 205 generally provides an interface between the circuitry in sensor system 165 and microcontroller 110. Microcontroller interface may include analog to digital and digital to analog converters, level shifters, multiplexers, demultiplexers, and any other circuitry for providing a signal path between microcontroller 110 and the circuitry of sensor system 165.

Control circuitry 220 may include logic circuitry for generally controlling the operation of sensor system 165, and may operate in conjunction with memory 215. For example, control circuitry 220 may include a processor that operates programs found in memory 215. Memory 215 may provide storage for measurements acquired by the one or more sensors 230. Memory 215 may be arranged as a 128K×8, 1 Mbit flash memory with a serial address and data bus. Memory 215 may also be configured as a non-volatile memory which retains its contents in the event of a power loss. In one embodiment, the above mentioned programs 170 that may be accessed by microcontroller 110 for controlling and interacting with sensor system 165 may be stored in memory 215, in addition or as an alternative to storing them in on-board memory 120.

Power source 225 may use lithium cell construction and may be for example, a 2000 MaH lithium battery pack. In this embodiment, power source 225 supplies power to the components of sensor system 165, and to microcontroller 110. In another embodiment power source 225 may be a conventional power supply or a battery power supply provided as part of microcontroller 110.

The one or more sensors 230 may include sensors for detecting various types of conditions, for example environmental conditions, locations, or time periods. More particularly, sensors 230 may include, for example, a humidity sensor 235, a temperature sensor 240, an accelerometer 245, a timer 250, and a global positioning system (GPS) sensor 225. Each of the one or more sensors 230 may include suitable support circuitry, for example, amplifiers, filters, and converters, and may be capable of providing an analog output or a digital output as required. Each of the sensors 230 may be connected individually or via a bus to other circuitry, and may also be capable of generating an interrupt, alarm, or some other type of alert in the event that one or more particular conditions exist, or that any number of thresholds have been exceeded or have not been met. One or more of the sensors 230 may include a "sample and hold" capability where a particular measurement may be latched or otherwise held until read from the particular sensor. Any number of the sensors 230 may also include identifying circuitry for allowing another device to determine the presence, location, type, and capabilities of each sensor 230 having such circuitry.

Humidity sensor 235 may be a capacitive humidity sensor with appropriate support circuitry, an analog output humidity module, or a digital output humidity module. In one embodiment, humidity sensor is capable of sensing a range of from about 0% to about 100% relative humidity.

Temperature sensor 240 may be a thermistor, thermocouple, or a resistance temperature device (RTD) with suitable support circuitry. Temperature sensor 240 may be capable of measuring a temperature in the range of from about −55 to about +125 degrees C., and may provide an analog or digital output.

Accelerometer 245 may be multi-axial, that is, it may be capable of measuring acceleration in two or three orthogonal directions simultaneously. Accelerometer 245 may be capable of measuring a range of acceleration from about 0 to 100 g's.

Timer 250 may be capable of measuring elapsed time or particular time periods. Timer 250 may be a programmable device capable of starting or stopping upon receiving a trigger and of generating a signal upon the expiration of a particular period. Timer 250 may be triggered by other sensors of sensor system 165. For example, timer 250 may be used to measure total time spent in the distribution channel, an amount of time spent at a particular humidity level, or an amount of time spent below a particular temperature threshold.

GPS sensor 255 is generally capable of receiving signals from the Global Positioning System and providing information related to the global location of sensor system 165. GPS sensor 255 may include support circuitry for converting the received signals to coordinates and for conveying those coordinates to other circuitry of sensor system 165 and to microcontroller 110.

Sensor interface 260 provides a connection point for any additional sensors that may be desired. Sensor interface 260 may include one or more connectors, clips, pads, or other devices for providing electrical contacts for connecting sensors to sensor system 165. In addition, sensor interface 260 may include through holes, pins, standoffs or other mounting devices for physically supporting the additional sensors.

Communications port 265 provides a communications interface to an external device such as a computer (not shown). Communications port 265 may be an RS 232, 422, or universal serial bus (USB) serial port and may include a connector 275 for connection to the external device.

Power switch 270 is coupled to communications port 265 and is operable to apply power to communications port 265 when the external device is plugged in or otherwise connected to connector 275.

Examples of the operation of the data acquisition system 100 will now be described with reference to FIGS. 1 and 2. In one embodiment, when sensor system 165 is connected to microcontroller 110, power source 225 supplies power to microcontroller 110. Microcontroller 110 recognizes that sensor system 165 is connected and accesses programs 170 from on-board memory 120 or from memory 215 to operate sensor system 165. Microcontroller may operate exclusively to control sensor system 165, or may control sensor system 165 while performing other operations associated with product 105.

Upon recognizing that sensor system 165 is connected, under control of programs 170, microcontroller 110 may initialize itself and cause the components of sensor system 165 to initialize. Programs 170 may then cause microcontroller to determine the presence type and capabilities of sensors 230 and set thresholds and alert parameters as appropriate for measuring particular conditions to which product 105 may be subjected. Individual ones of sensors 230 may also set up to generate interrupts upon reaching or failing to reach certain thresholds or generally upon measuring certain conditions. RTC 130 may also be programmed to generate an interrupt for microcontroller 110 on a periodic or other basis.

After completing the above mentioned initialization and setup procedures, microcontroller 110 may then enter a "sleep" mode having limited functionality and power requirements. For example, microcontroller 110 may disable A/D 125, UART 135, and a portion of on-board memory 120, and may operate microprocessor 115 in a reduced power mode where it may only respond to certain interrupts, such as those from RTC 130 and sensor system 165.

Upon receiving an interrupt from RTC 130 or sensor system 165, microprocessor 115 may enable all circuitry of microcontroller 110, and microcontroller 110 may operate to examine the interrupt and identify a service routine to be performed. For example, an RTC generated interrupt may be serviced by reading the current humidity from humidity sensor 235, the current temperature from temperature sensor 240, location information from GPS sensor 255 and a time value from RTC 130. A date and time stamp may then be generated from the time value and associated with the temperature, humidity, and location measurements and then the measurements and associated time and date stamp may be stored in memory 215.

As another example, accelerometer 245 may be programmed to generate an interrupt upon exceeding a particular acceleration value, for example, 5 g's. Upon exceeding that threshold, an interrupt is generated, microcontroller 110 identifies the type of interrupt service routine required and reads the acceleration value, location information, and time value from accelerometer 245, GPS sensor 255, and RTC 130, respectively. These values may then be stored in memory 215.

The contents of memory 215 may be retained until product 105 reaches a particular location, for example, a final destination, or when an end user takes possession. When desired, the contents of memory 215 may be read and used to analyze the conditions to which product 105 has been subjected.

In one embodiment, the contents of memory 215 may be obtained by plugging a suitable connector, connected to an external computer or other device, into connector 275 of communications port 265. For example, plugging into connector 275 may cause power switch to energize communications port 265 and connector 275, and may generate an interrupt to microcontroller 110. Upon receiving the interrupt, microcontroller 110 examines the interrupt, identifies the appropriate service routine and proceeds to send the measurements stored in memory 215 to communications port 265 and out through connector 275.

In another embodiment, the contents of memory 215 may be obtained by a request or communication through network 145, for example from enterprise 140. A user at one of the computers 155 may generate such a request, or the request may be generated automatically by one of the computers 155, for example, upon a data entry that product 105 has arrived at an end user destination. The request may be routed through internal network 160 to computer 150 and then through network 145 to microcontroller 110. Upon receiving the request, microcontroller 110 causes the measurements stored in memory 215 to be transmitted back to the requesting computer 155. Optionally, the request may specify an alternate destination for the measurements and microcontroller 110 may cause the measurements to be sent to the alternate destination.

While the present invention has been discussed in the context of recording shipping conditions, it should be understood that the present invention may also be used to monitor conditions during any phase of the life cycle of product 105. For example, system 100 could be used to detect improper storage or operating temperatures that may void a warranty for sensitive equipment. System 100 may also be used to sense conditions that may signify abuse of product 105, use beyond rated specifications, or to record anomalous conditions occurring intermittently in a normal user environment.

The present invention advantageously provides a data acquisition system that is relatively inexpensive and that may be easily integrated into an existing product. This facilitates collecting data from a large sample population, or may even be used for every instance of a particular product. The invention also provides a data acquisition system that does not require modification of existing packaging or modification of the form factor of a product. As a further advantage, the invention provides for straightforward data retrieval through a communications port or through a network.

It should be understood that the foregoing description is only illustrative of the invention. Various alternatives and modifications can be devised by those skilled in the art without departing from the invention. Accordingly, the present invention is intended to embrace all such alternatives, modifications and variances.

What is claimed is:

1. A system for acquiring environmental data comprising:

an existing product for shipment to an end user controlled by a microcontroller;

a sensor system removably integrated within the existing product and initialized by the microcontroller for recording environmental conditions to which the existing product is exposed; and a computing device, which upon being connected to the existing product, is operable to retrieve the recorded environmental conditions.

2. The system of claim 1, wherein the existing product further comprises a device for storing the recorded environmental conditions.

3. The system of claim 1, wherein the sensor system is operable to record environmental conditions independent of the operation of the existing product.

4. The system of claim 1, wherein the sensor system further comprises a device for storing the recorded environmental conditions.

5. The system of claim 1, wherein the computing device, upon being connected to the sensor system, is operable to retrieve the recorded environmental conditions.

6. The system of claim 5, wherein the sensor system further comprises communication port for providing the recorded environmental conditions to the computing device.

7. The system of claim 1, wherein the sensor system further comprises one or more of a humidity sensor, a temperature sensor, an acceleration sensor, and a position sensor.

8. The system of claim 1, wherein the computing device further comprise a program operable to analyze the retrieved recorded environmental conditions.

9. An existing product for shipment to an and user comprising:

a microcontroller for controlling the existing product;

a sensor system removably integrated within the existing product and initialized by the microcontroller for recording environmental conditions to which the existing product is exposed; and a communication port for communicating with a computing device, which upon being connected to the existing product, is operable to retrieve the recorded environmental conditions.

10. The existing product of claim 9, further comprising a device for storing the recorded environmental conditions.

11. The existing product of claim 9, wherein the sensor system is operable to record environmental conditions independent of the operation of the existing product.

12. The existing product of claim 9, wherein the sensor system further comprises a device for storing the recorded environmental conditions.

13. The existing product of claim 9, wherein the sensor system further comprises a communication port for providing the recorded environmental conditions to the computing device.

14. The existing product of claim 9, wherein the sensor system further comprises one or more of a humidity sensor, a temperature sensor, an acceleration sensor, and a position sensor.

15. A sensor system for removable connection to an existing product for shipment to an end user, comprising:

an interface to a microcontroller controlling the existing product; and one or more sensors for recording environmental conditions to which the existing product is subjected, wherein the sensor system is removably integrated within the existing product and is initialized by the microcontroller for recording environmental conditions to which the existing product is exposed, and is operable to provide the recorded environmental conditions to a computing device, upon the computing device being connected to the existing product.

16. The sensor system of claim 15, wherein the microcontroller operates the sensor system independently of the operation of the existing product.

17. The sensor system of claim 15, further comprising a device for storing the recorded environmental conditions.

18. The sensor system of claim 15, further comprising one or more of a humidity sensor, a temperature sensor, an acceleration sensor, and a position sensor.

* * * * *